(12) United States Patent
Milas

(10) Patent No.: US 10,467,329 B2
(45) Date of Patent: Nov. 5, 2019

(54) SYSTEM AND METHOD FOR EMPLOYING KINETIC TYPOGRAPHY IN CMC

(71) Applicant: Expressy, LLC, Greer, SC (US)

(72) Inventor: Lisa Milas, Greer, SC (US)

(73) Assignee: Expressy, LLC, Greer, SC (US)

(*) Notice: Subject to any disclaimer, the term of this patent is extended or adjusted under 35 U.S.C. 154(b) by 0 days.

(21) Appl. No.: 15/398,585

(22) Filed: Jan. 4, 2017

(65) Prior Publication Data
US 2017/0192939 A1    Jul. 6, 2017

Related U.S. Application Data

(60) Provisional application No. 62/274,555, filed on Jan. 4, 2016.

(51) Int. Cl.
| | | |
|---|---|---|
| *G06F 17/21* | (2006.01) | |
| *G06T 13/80* | (2011.01) | |
| *G06T 5/00* | (2006.01) | |
| *H04W 4/14* | (2009.01) | |

(52) U.S. Cl.
CPC ............ *G06F 17/214* (2013.01); *G06T 5/002* (2013.01); *G06T 13/80* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 6,522,333 B1 | 2/2003 | Hatlelid et al. | |
| 6,999,989 B2 | 2/2006 | DeLaCruz | |
| 7,039,676 B1 | 5/2006 | Day et al. | |
| 8,988,490 B2 | 3/2015 | Fujii | |
| 10,331,336 B2* | 6/2019 | Chaudhri | G06F 3/04883 |
| 2006/0041848 A1* | 2/2006 | Lira | G06Q 10/107 |
| | | | 715/805 |
| 2011/0055675 A1 | 3/2011 | Sakai | |
| 2011/0181605 A1 | 7/2011 | Ostermann et al. | |
| 2012/0182309 A1* | 7/2012 | Griffin | H04W 4/14 |
| | | | 345/619 |
| 2013/0128058 A1 | 5/2013 | Sagayaraj et al. | |
| 2014/0212007 A1* | 7/2014 | Oh | G06F 17/214 |
| | | | 382/119 |
| 2014/0278370 A1* | 9/2014 | Chen | G06F 17/24 |
| | | | 704/9 |
| 2016/0028666 A1* | 1/2016 | Li | G06F 3/0482 |
| | | | 715/752 |

* cited by examiner

*Primary Examiner* — Jeffrey J Chow
(74) *Attorney, Agent, or Firm* — Kim and Lahey Law Firm LLC; Douglas W. Kim

(57) ABSTRACT

A computer system for allowing user to communicate with text enhanced with emotional preset having attributes and kinetics including computer readable instructions that, when executed by a processor, perform the steps of: receiving a set of text characters, receiving an emotional preset selection information, creating a unlined animated text message or unlined social message, transmitting the unlined messages to a recipient using CMC or social media to receive the message to convey to the recipient the emotional communications selected by the sender.

10 Claims, 11 Drawing Sheets

SYSTEM AND METHOD FOR EMPLOYING KINETIC TYPOGRAPHY IN CMC

CLAIM OF PRIORITY

This application is a U.S. Non-provisional Patent Application that claims priority from U.S. Provisional Patent Application 62/274,555 filed Jan. 4, 2016.

BACKGROUND OF THE INVENTION

1) Field of the Invention

The present invention relates to a computer solution directed to the computer problem of incomplete communications when using computer-mediated communication such as text messaging, short message services, and social media posting. The invention is directed to system of augmenting text, to include the ability of the recipient to experience the non-textual communications normally associated with human communications and interactions.

2) Description of Related Art

Expressive communication is effective communication. Nonverbal information is an important cue to the speakers meaning; especially when the literal content may be ambiguous. The same statement, depending on the tone and emphasis, among other acoustic parameters, may be sarcastic or serious, sad or confused, tired or disinterested. This remains a common problem over computer mediated communication ("CMC") platforms such as text messaging, short message services (SMS), instant messaging, emailing, social media posts, and the like. The inability to communicate these nonverbal/non-textual message in CMC is a problem that needs a resolution. Without such a resolution, the risk of miscommunication is substantially increased.

The inability to communicate nonverbally over CMC platforms leads to a high degree of miscommunication and increased susceptibility to misinterpretation. These limitations of expression and lack of alternatives continues to be a frequent problem within messaging applications. This problem as given rise to the use of emojis or emoticons as the principal method for conveying emotion over text messaging. However, these emojis cannot function as a means of conveying the vast range of human emotion, nor can they provide the information necessary to determine the context or meaning of a message.

For example, to attempt to improve the inability of conveying emotion in text and the disadvantages emojis or emoticons, attempt such has those found in U.S. Pat. No. 6,522,333 have appeared. This reference purports to provide "a system and method for remote communication is disclosed that allows communication over a network but still provides a behavioral context within which the communication is interpreted". However, it is a cumbersome and slow system and method using one window containing a visual representation of the user (e.g. a graphic depiction of a face) and for each recipient, other windows containing visual representations for that recipient. This system and method is not well suited for SMS nor social media posts.

U.S. Pat. No. 6,999,989 also seeks to provide civeo return receipt information for electronic mail by adding video of the electronic mail recipient. U.S. Pat. No. 7,039,676 is directed to system, method, and program of the invention captures actual physical gestures made by a participant during a chat room or instant messaging session or other real time communication session between participants over a network and automatically transmits a representation of the gestures to the other participants. Again, this system is not well suited for CMC and virtually impractical for social media posts. United States Patent Publication 2013/0128058 seeks to provide a request to capture a reaction of a user when the message is displayed to that user/recipient. United States Patent Publication 2011/0181605 is directed to a method that is provided for creating a personal animated entity for delivering a multi-media message from a sender to a recipient. U.S. Pat. No. 8,988,490 is directed to a system that generates parameter information that shows states of a user. The generated parameter information is transmitted through a network to an information processing apparatus of a communication partner capable of generating an image that reflects the state of the user on the basis of the parameter information.

There has also been attempts to adapt to text of a message to express emotion. For example, United States Patent Publication 2011/0055675 is directed to a method of modifying portion of the textual message dynamically to indicated a heightened emotional value. By depressing a key on a keyboard for a period longer than a typical debounce interval, a plurality of text parameters for the character associated with the depressed key are accessed and one of the text parameters is chosen. Animation processing is then performed upon the textual message and the indicated portion of the textual message is visually emphasized in the animated text message. However, this invention requires that the force exerted upon a key of a keyboard is known which is difficult, if not impossible, with modern communications devices such as smart phones and the like. Further, the user is forced to determine the effect on the text to represent an emotion which suffers the same problem with miscommunications of text itself.

Accordingly, it is an object of the present invention to provide a system for communicating nonverbal information over CMC platforms.

It is another object of the present invention to properly animate a text message to communicate nonverbal information associated with a text message without an intermediate processing server.

It is another object of the present invention to properly animate a text message to communicate nonverbal information associated with a text message that can be used with SMS.

It is another object of the present invention to properly animate a text message to communicate nonverbal information associated with a text message for social media posting.

SUMMARY OF THE INVENTION

The above objectives are accomplished by providing a computerized system for emotionally augmented computer-mediated communication comprising: a mobile communications device having a display, computer readable medium, processor, input assembly, transceiver and a sender's computer-mediated communication system; a first text area displayed on the display having a foreground and a background position; a second text area displayed on the display having a foreground position and a background position and partially overlapping the first text area wherein the second text area transitions from its foreground position to its background position and the first text area transitions from its background position to its foreground position in conjunction with the second text area transmitting; a set of emotional presets stored in the computer readable medium wherein each emotional preset includes a set of attributes and a set of kinetics wherein the set of attributes include sub-attributes selected from the group consisting of linear scale, vertical scale, horizontal scale, skew, line spacing, character spacing, position, blur, stroke, path shape and any combination thereof and the set of kinetics includes a set of sub-kinetics selected from the group consisting of opacity, character motion, word motion or any combination thereof; a set of effects stored in the computer readable medium including scale, stroke, position and time; a set of messaging computer readable instructions including in the computer readable medium, when executed by the processor, include instructions for receiving an emotional preset selection through the input assembly representing the sender's emotional selection, receiving an effect selection through the input assembly representing the sender's effect selection, intercepting a set of message text characters in a lined format representing an outgoing message from the sender's computer-mediated communication system, placing the first text area in its background position and placing the second text area in its foreground position, determining an initial state for the set of message text characters, determining an end state for the set of message text characters according to the emotional selection preset and the effect selection, determining an animation path having a plurality of incremental states between the initial state and the end state, determining an animation area size according to the initial state, emotional preset selection, effect selection, animation path, and end state, converting the set of message text characters to an unlined animated text message according to the initial state, emotional preset selection, effect selection, animation path, and end state, sizing the animated text message to fit within the animation area size, displaying the sized unlined animated text message on the display in the second text area, and transmitting the sized unlined animated text message to a receiver's computer-mediated communication system; and, a set of canvas computer readable instructions including in the computer readable medium, when executed by the processor, includes instruction for receiving a set of social text characters in a lined format representing a social media message, determining an initial state for the set of social text characters, determining an end state for the set of social text characters according to the emotional preset selection and the effect selection, determining an animation path having a plurality of incremental states between the initial state and the end state, determining a social area size according to the initial state, emotional reset selection and the effect selection animation path, and end state, converting the set of social text characters to an unlined animated social text message according to the initial state, the emotional preset selection, the effect selection, animation path, and end state, sizing the unlined animated social text message to fit within the social area size, displaying the sized unlined animated social text message on the display, and transmitting the sized animation social text message to a social media site.

The invention can include emotions such as, but not limited to, happy, sad, angry, frustrated, and sarcastic that can be represented by the emotional presets. The linear scale can modify an initial message text vertical size between 25% and 300%, the vertical scale can modify the set of message text characters vertical size between 50% and 400%, the horizontal scale can modify the set of message text characters horizontal size between 50% and 400%, the skew can modify the set of message text characters between −90° and +90°, the line spacing can modify the set of message text characters is in the range of 1 to 3, the character spacing can modify the set of message text characters is in the range of 3 points condensed to 10 points expanded, and the blur can modify the set of message text characters by a distortion in the range of 50% to 300%.

The message computer readable instructions can be determining an animation path that includes instructions for creating an initial bitmap of the message text characters, creating an end bitmap according to the sized unlined animated text message, determining a pixel map according to the initial bitmap and the end bitmap and creating a pixel path for each pixel in the pixel map to transform the set of message text characters to the sized unlined animated text message. The message computer readable instructions can include instructions for determining an animation path includes instructions for converting the set of message text characters to an intermediate unlined animated text message, determining a pixel map according to the initial bitmap, the intermediate unlined animated text message, and the end bitmap, creating a first pixel path between each pixel in the pixel map associated with the message text characters and each pixel in the pixel map associated with the intermediate unlined animated message text message and creating a second pixel path between each pixel in the pixel map associated with the intermediate unlined animated text message and the sized unlined animated text message. The animation path can include instructions for previewing the sized unlined animated text message prior to transmitting the sized unlined animated text message to the receiver's computer-mediated communication system.

The invention can include instructions for converting the set of message text characters to an unlined animated text message including instructions for receiving a selected word in the set of message text characters, converting the selected word into an animated word according to the effect selection and including the animated word in the sized unlined animated text message. The set of effects can include scale in the range of 25% to 400%, stroke in the range of 0% to 250%, and position from −2 lines to +2 lines vertically. The computer readable instructions can include instructions for converting the set of message text characters to an unlined animated message text message including instructions for determining an initial word bitmap, creating an end word bitmap, determining a pixel map according to the initial bitmap and the end bitmap and creating a pixel path between each pixel in the pixel map associated with the selected word and each pixel in the pixel map associated with animated word.

The computer readable instructions can include instructions for: opacity kinetic transitioning of a character from a first transparency to a second transparency wherein the first transparence is in the range of 0% to 100% and the second transparency is in the range of 0% to 100%, character kinetic transitioning from a first character position to a second character position wherein the second character position is in the range of −200% to +200 in vertical relation to the first character position, character kinetic scale transitioning from a first character size to a second character size wherein the second character size is in the range of 25% to 300% in relation to the first character size, character kinetic stroke transitioning from a first stroke value to a second stroke value wherein the second stroke value is in the range of 25% to 250% in relation to the first stroke value, and including in the sized unlined animated text message a kinetic transition selected from the group of opacity, kinetic transitioning, character kinetic transitioning, character scale, character kinetic stroke or any combination thereof.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

This invention provides for a system allowing the communications of non-verbal information over CMC platforms such as text messaging, instant messaging, email, and the like. The invention uses kinetic typography (e.g. animated text), within a text messaging application to communicate emotions that can be distinguished from text or verbal communications by their visual and auditory cues (e.g. non-textual/nonverbal communication). Principally, a specific visual representation of an original typical lined text message is converted into a sized unlined animated message text to convey the appropriate visual representation of an emotion to the recipient from the sender while using existing CMC infrastructure.

Non-textual/nonverbal cues are present in written text when considering handwriting. Handwriting include properties such as style, size, and spatial arrangements of the letters and words (e.g. typography). These properties are referred to as the attributes. Non-textual/nonverbal cues in speech include rate, pitch, volume, and their respective prosodic features such as rhythm, intonation, and stress. These non-textual/nonverbal cues can be quantitatively measured and defined by their waveforms. These waveforms and their values can characterize emotions. These type of properties are referred to as the kinetics. This invention can use attributes and kinetic values together with text to provide emotional communications and enhance the communications above what is possible with mere text.

The invention can include emotional presets. Emotional presets include attributes and kinetics and are represented in the form of specifically designed sized, unlined animated message that display the emotion corresponding to the preset's information. Words and phrases of the text can be emphasized along with applying effects. The type of effect is dependent on the selected preset.

Emotional text is text that holds the characteristics of an emotional preset and/or effect, and any other behaviors or characteristics that deviates from the original text message from a CMC system. A trigger is the input that causes an animation and/or effect to be applied. An action onset is the time of onset that an animation appears and can be dependent on effect type. A post action occurs after characters have appeared and can be used to intensify degree of an emotion. A live action, occurs when first character appears and the attributes can be animations (but not all animations are necessarily attributes). For a preset, there can be defined attribute and kinetic values. For an effect, there can be a second set of attributes and kinetic values, intended for application on a characteristic word or short phrase.

Figure 1:
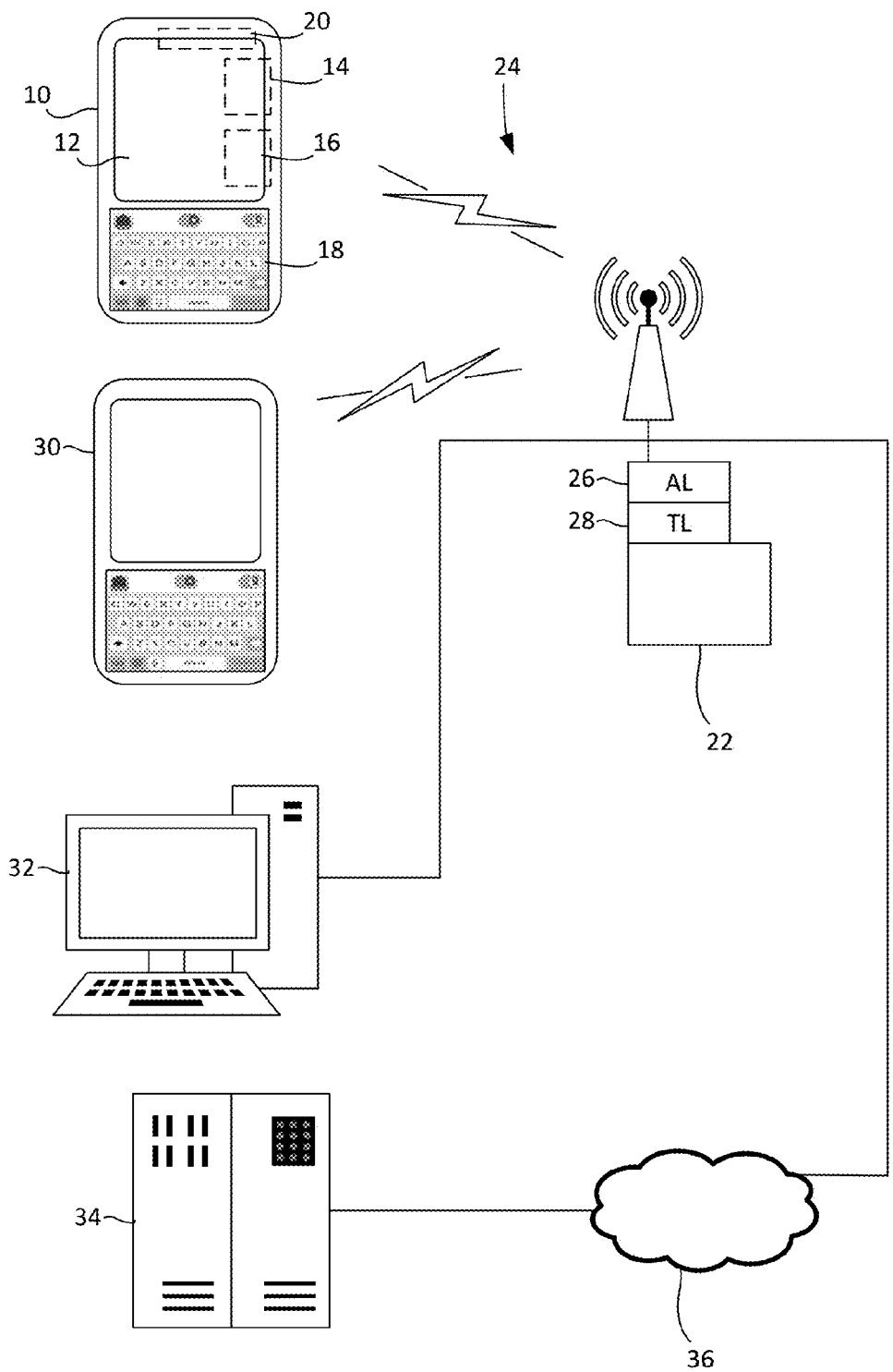
FIG. 1 is a schematic of aspects of the invention.

Referring now to FIG. 1, the invention is shown as it is integrated in the existing CMC infrastructure. A sender's computing device 10 such as a smart phone, portable computer or other computer device include a display 12, computer readable medium 14, processor 16, input assembly 18 and transceiver 20. The computing device can be in communications with a short message service infrastructure 22 through a wired or wireless network 24. When the computer device sends a message, the computer device creates data that is provided to gateway at the application layer 26. The message is then sent to the transfer layer 28 for transmission. This is for a mobile originated message from a sender. The message is then decoded and provided back to the transport layer and sent to the recipient's mobile device 30. The message that is received is a mobile terminated message and takes on a different format than that of a mobile originated message. In one embodiment, the computer readable instructions of the present invention are located on the sender's and recipient's computer devices and create the emotional message prior to transmission of the message to the application layer. In one embodiment, the computer readable instructions of the present invention are located at the application layer. The sender and recipient can be using the portable computer devices 10 or 30 or can be using a computer device 32 with a wired connection such as a desktop or laptop. The sender and recipient can also be using the infrastructure provided by social media infrastructure 34 which can be accessible through a local area network, wide area network or local communications network 36.

Figure 2B:
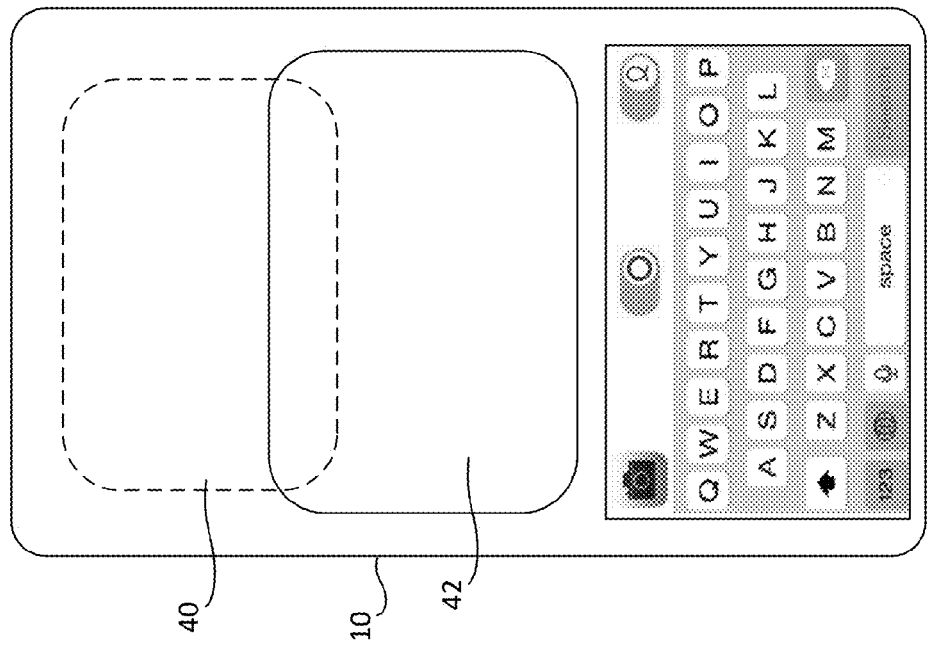
FIGS. 2A and 2B are front view of aspects of the invention.
Figure 2A:
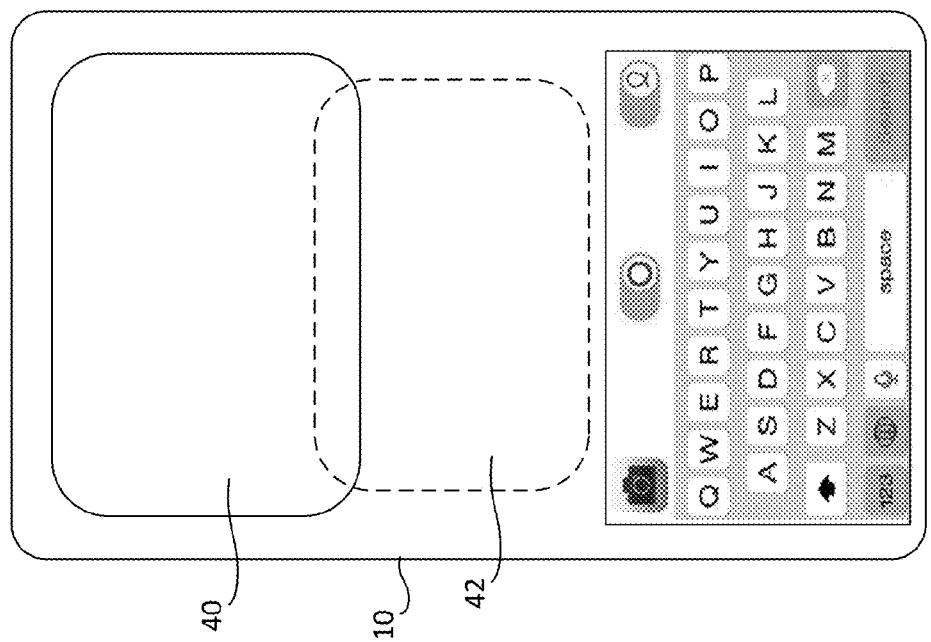

Referring to FIGS. 2A and 2B, the sender's computer device 10 is shown having a first text area 40 where the recipient's incoming messages are displayed. The sender's messages are shown in a second text window 42. The first text area and the second text area can include a background position and a foreground position. When the sender receives a message from a recipient, the first text area can have an area larger than that of the sender and the first text area can be positioned overlapping and partially covering the second text area. This indicates that the recipient was the last user in the conversation to have sent a message. Referring to FIG. 2B, the second text area is brought to the forefront and is larger than the first text area. In this configuration, the sender is composing a message, previewing a message, preparing to send a message or sending a message. The second text area is overlapping the first text area and partially obscuring the first text area. The second text area, when transitioning from its foreground position to is background position, the first text area can transition from its background position to its foreground position in conjunction with the second text area.

Figure 3:
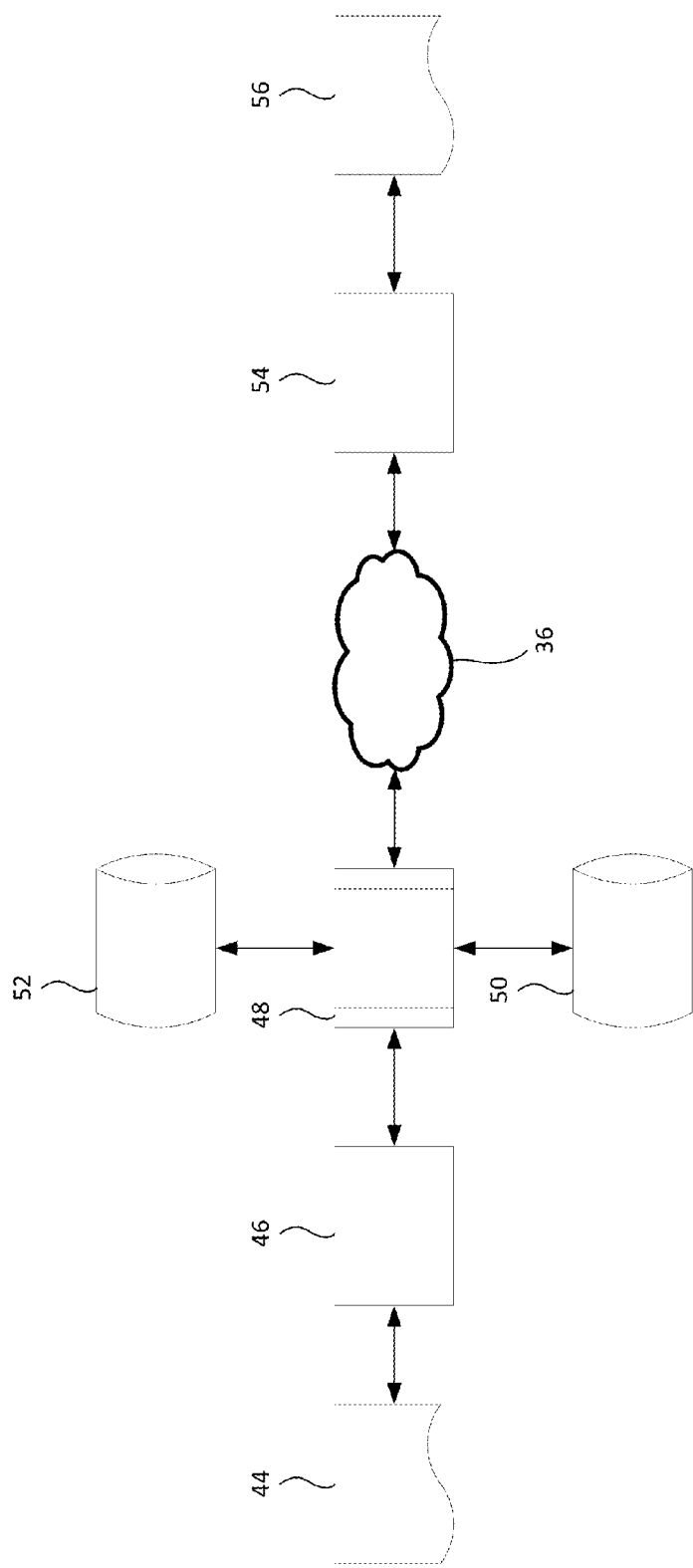
FIG. 3 is a schematic of some components of the invention.

Referring to FIG. 3, the operation of the present invention is shown in more detail. The sender creates a message 44 that is a lined text message and represents an outgoing message from the sender's computer mediated communications system. The text message can be intercepted by computer readable instructions from the sender's CMC or other text generating system at 46. Computer readable instructions 46 can determine an initial state which can include a determination of the characters, words and punctuation in a set of text characters included in the text message at 48. The computer readable instructions can receive an emotional preset selection represented an emotional preset selected form from a set of emotional presents 50 and an effect section represented an elected effect from the set of effects 52 by the sender. The computer readable instructions can determine an end state which represent the final frame of a sized unlined animated message text to be sent to the recipient. Incremental states can be determined that show the transition of the visual image of the set of text characters to the sized unlined animated text message. Using the incremental states and the end state, an area size can be determined that represent the maximum display area needed to display the incremental states and the end state. The computer readable instructions can calculate an animation path used to display the initial set of text characters and the transition, through the incremental states to the end state to display the message to the recipient. The animated unlined text message can be sized to fit within the display if the area size is larger than the second text area or of the animated unlined text message is too large to properly display. The computer readable instructions can then display the sized unlined animated text message to the sender for review and confirmation or approval for transition. The computer readable instructions can then transmit the sized unlined animated text message through a local area network, wide area network or global communications network 36 to a recipient CMC 54 so that the sized unlined animated text message 56 can be viewed by the recipient.

In one embodiment, the computer readable instructions include instructions for receiving social text characters. These are text characters or text messages that are designed to be transmitted to recipient thought social media infrastructure such as through email, postings, blogs, and social media SMS systems. In this embodiment, the sender is provided with a canvas that is similar to the second text area, but without the need to display a first text area. The sender composes a social text message defined by a set of social text characters. The computer readable instructions can then determining an initial state for the set of social text characters, determining an end state for the set of social text characters according to the selected emotional preset, determining a social area size according to the initial state, an animation path, and end state, converting the set of social text characters to an unlined animation social text message according to the initial state, animation path, effects, and end state, sizing the animated social text message to fit within the social area size, displaying the sized animation social text message on the display, and transmitting the sized animation social text message to a social media site.

Figure 4:
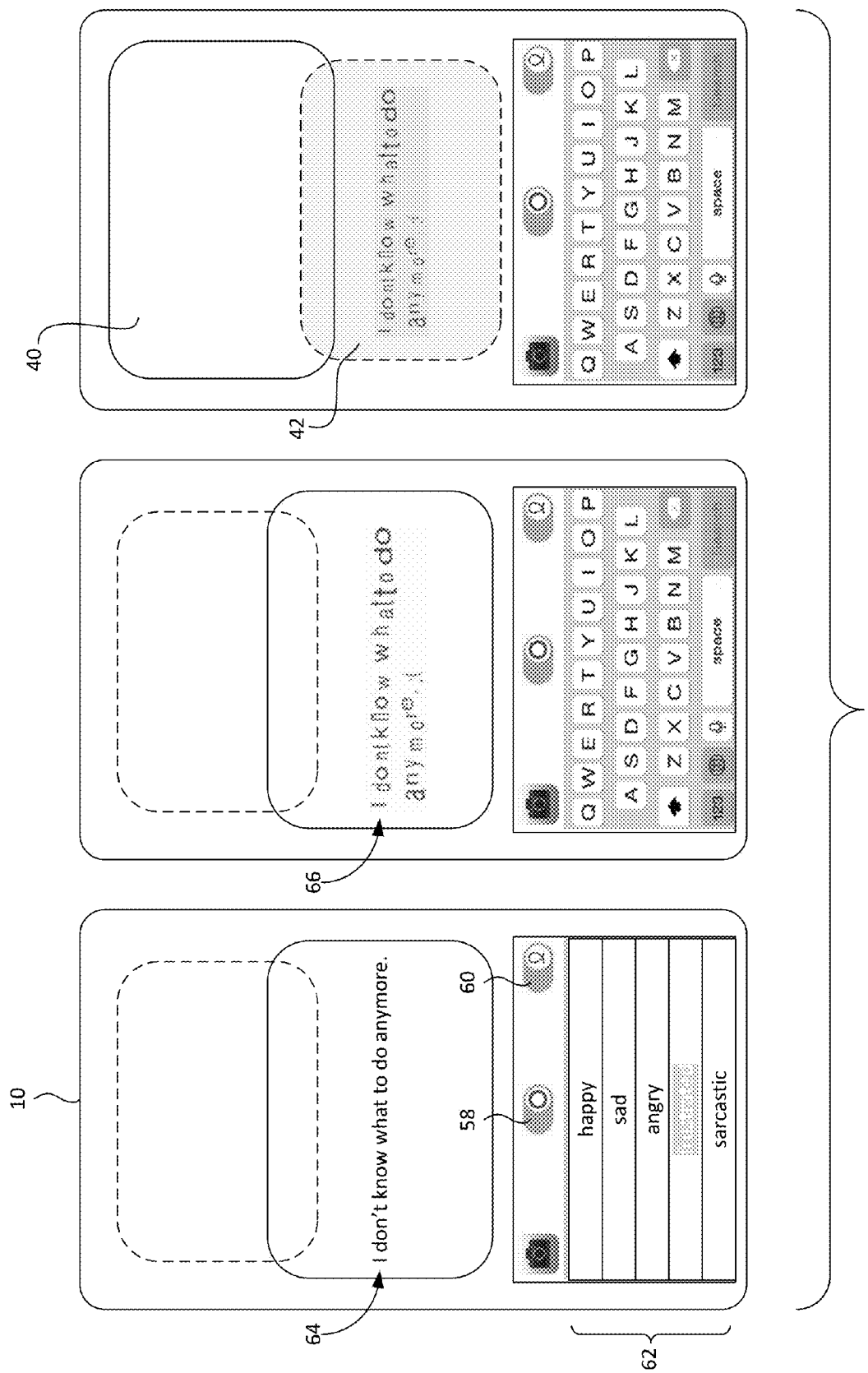
FIG. 4 is a front view of aspects of the invention.

Referring to FIG. 4, in one embodiment, the emotional preset can include a set of attributes having a linear scale that can modifies an initial message's text vertical size between 25% and 300%, a vertical scale that modifies the initial message text vertical size between 50% and 400%, a horizontal scale that modifies the initial message text horizontal size between 50% and 400%, a skew that modifies the initial message text characters between −90° and +90°, line spacing that can ne in the range of 1 to 3, character spacing that can be in the range of 3 points condensed to 10 points expanded, and a blur function that can include a distortion in the range of 50% to 300%.

The sender computer device 10 can include an emotion preset actuation 58 allowing the sender to turn on and off the ability to create emotional messages. A effects actuation 60 can also be included allowing the ability to add effects to the initial set of text characters. When the emotional presents are actuated, a listing of emotional presets 62 is displayed allowing the sender to select one or the emotional presents thereby indicating and created an emotional preset selection. Once selected, the attributes and kinetics are applied to the original text 64 resulting unlined animated text message 66. When the message is sent, the second text area can be moved to it background position and the first text area can be moved to is foreground position awaiting a response from the sender. In one embodiment, the second text area is moved to the background position upon receiving a messages from the recipient. When in its background position, the second text area can be smaller, underneath, and darker that the first text area.

Figure 5:
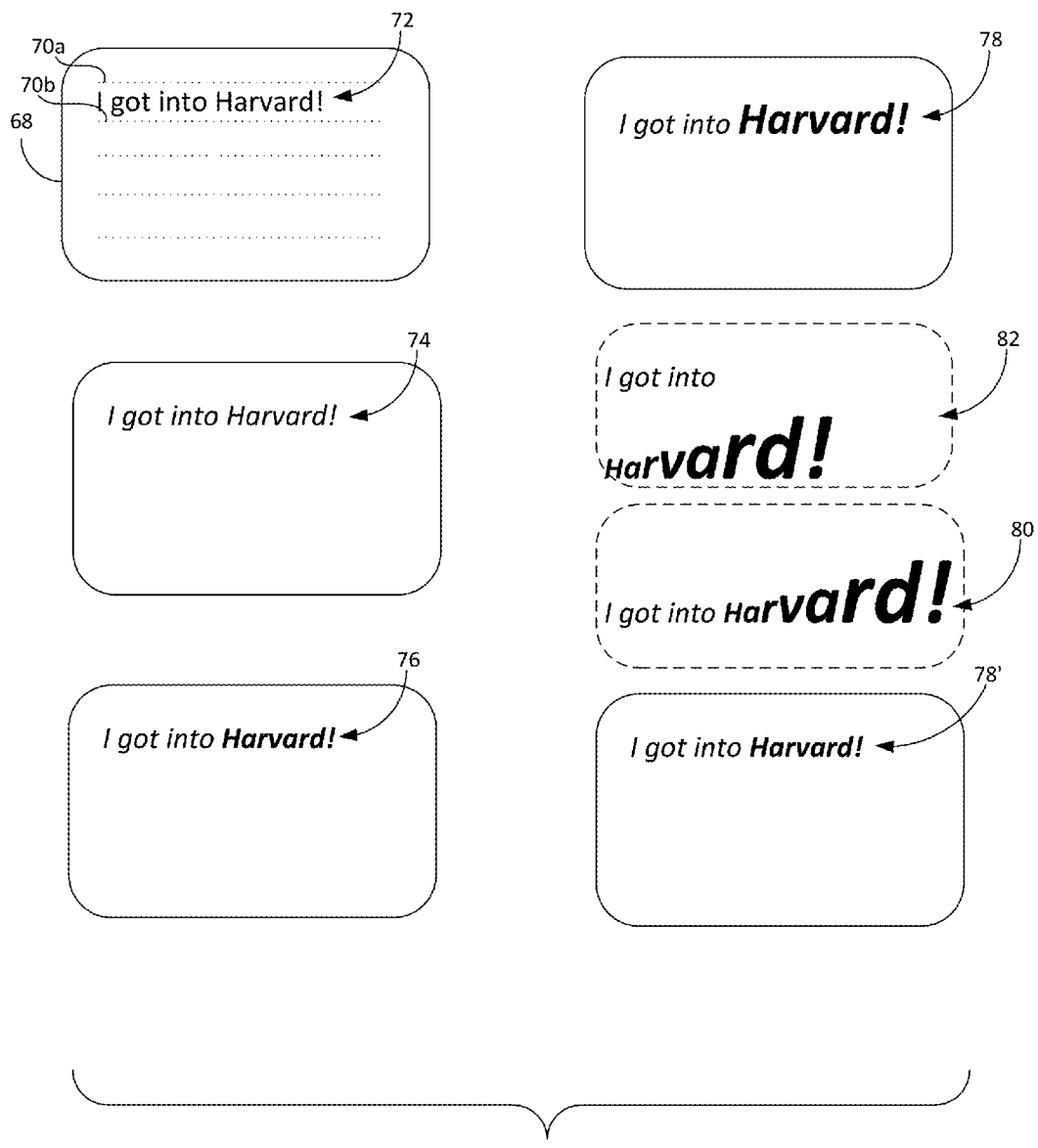
FIG. 5 is a front view of aspects of the invention.

Referring to FIG. 5, the creation of the sized unlined animated text or social message is shown in more detail. The initial set of text characters from the initial message created by the sender is shown as 68 on a display area. The initial message is a typical lined message having discrete lines 70a and 70b, for example. When the text reaches the end of the current line on the display, it wraps to the next line.

In the event that the sender selects an emotional preset, such as happy, the text characters 72 can be modified based upon the attributers and the kinetics associated with that emotional preset. For example, the characters can be skewed as at 74, have increased boldness at 76 and have a selected word increased in scale at 78. Therefore the final message 78 can be transmitted to the recipient. In one embodiment, an intermediate state 80 can be created using the emotional preset or the effects. In the example shown, the word "Harvard!" is with letters increasing in scale. Additionally, the intermediate states can include display the term "Harvard!" one character at a time in an animated arrangement as shown in the table below relative to time period:

| Time Period | Display |
|---|---|
| 1 | H |
| 2 | Ha |
| 3 | H*ar* |
| 4 | H*arv* |
| 5 | H*arva* |
| 6 | H*arvar* |
| 7 | H*arvard!* |

In this case, emotional presets and/or the effects cause the unlined animated text message to wrap to the line below as shown at 82. Therefore, the unlined animated text message is sized to fit into the display area. When the sized unlined animated text message is displayed, the animation path includes showing the initial message 72 as the initial state or the skewed message 74 as the initial state. The message transitions in the intermediate state 80 and the into the end state 78' so that the emotion of excitement or happiness is conveyed in a way that cannot be done with traditional CMC systems.

Figure 6:
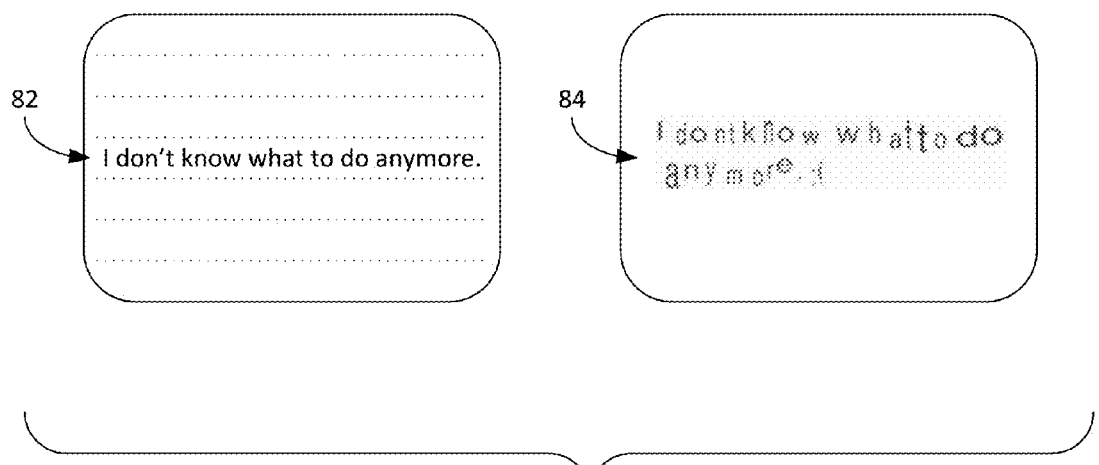
FIG. 6 is a front view of aspects of the invention.

Referring to FIG. 6, the lined set of text characters have has the initial state 82 that is intercepted from the sender's CMC or created by the sender using a CMC of other system. The end states can represent frustration and can have the initial set of text characters jumbled and travel along non-linear paths to results at the unlined animated end state. To create the visual representation of the characters moving or traveling from the initial state to the end state, an animation path can be created. In one embodiment, an initial bitmap is created representing the initial state of the message text characters. An end bitmap can be created representing the end state of the message text characters. A pixel map can be created according to the initial bitmap and the end bitmap that includes all the pixels of the initial state, intermediate states and end states so that pixel frames are created representing from the initial state to the end state. To create the visual representation of transitioning from the initial state to the end states, a pixel path can be created between each pixel in the pixel map associated with the initial state and the each pixel of the pixel map associated with the end state. In one embodiment, a fist pixel path can be created between the initial state and the intermediate state and the second pixel path from the intermediate state to the end state.

In one embodiment, the computer readable instructions can convert a selected character, word or portion of a set of text characters to an unlined animated text message without necessarily having to convert the entire initial text message. The computer readable instructions can provide for previewing the sized animation message or social text message prior to transmission to the receiver's computer-mediated communication system or social media. The sized animation message or social text message can be provided on the display of the sender's computer device and can be edited prior to transmission by changing the emotional preset or effects. Effects can be added, modified or removed. The set of effects can including scale in the range of 25% to 400%, stroke in the range of 0% to 250% and position from −2 lines to +2 lines vertically.

The kinetic aspect of the emotional preset can include an opacity kinetic for transitioning a character from a first transparency to a second transparency wherein the first transparence is in the range of 0% to 100% and the second transparency is in the range of 0% to 100%. Character kinetic can be included in the emotional preset for transitioning from a first character position to a second character position wherein the second character position is in the range of −200% to +200 in vertical relation to the first character position. Character kinetic scale can be included in the emotional preset for transitioning from a first character size to a second character size wherein the second character size is in the range of 25% to 300% in relation to the first character size. Character kinetic stroke can be included in the emotional preset for transitioning from a first stroke value to a second stroke value wherein the second stroke value is in the range of 25% to 250% in relation to the first stroke value.

Figure 7:
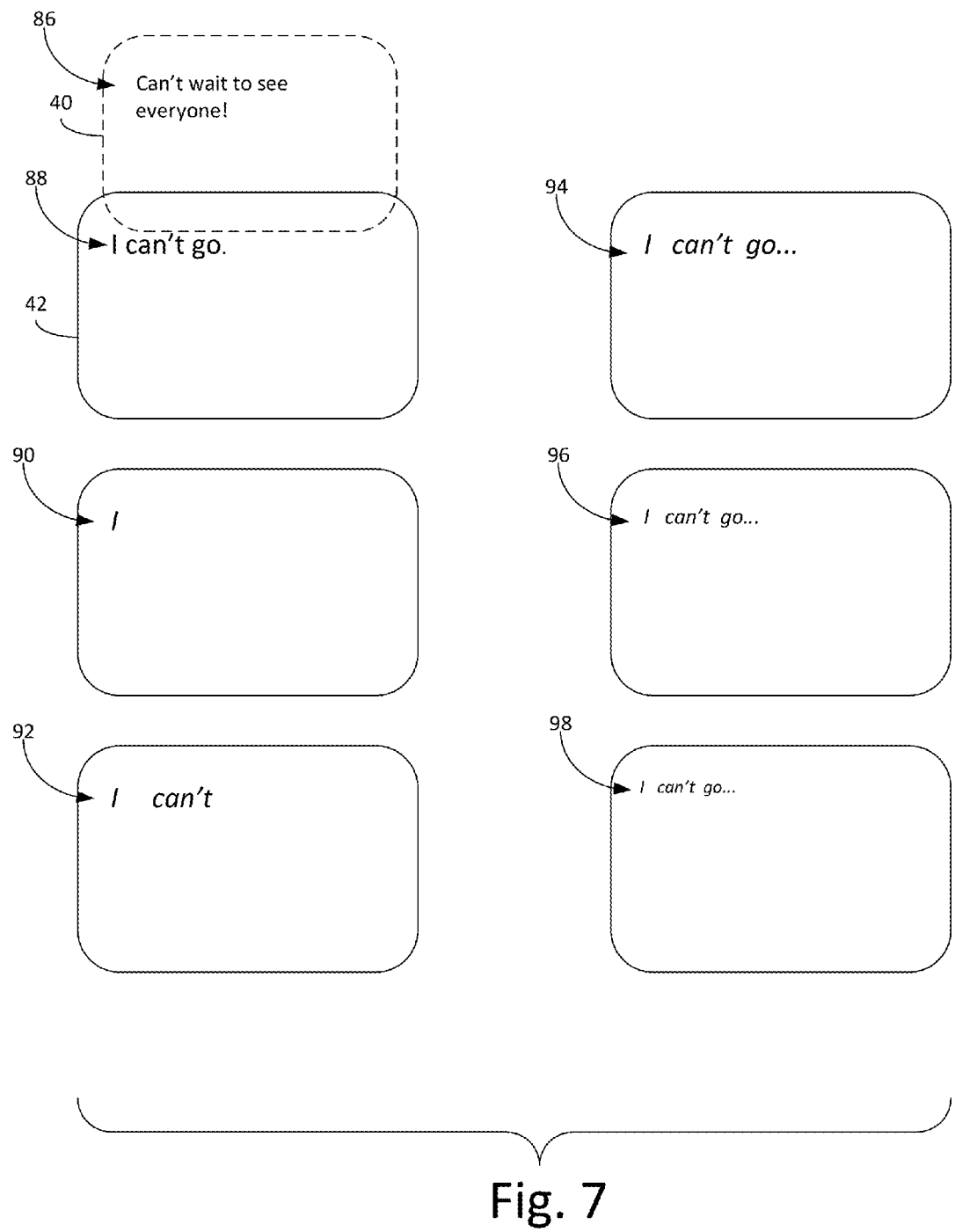
FIG. 7 is a front view of aspects of the invention.

Referring to FIG. 7, another example of the invention is shown. The sender receives a message from the recipient shown as "Can't wait to see everyone!" at 86 in the first text area 40. The sender then replies which causes the second text area 42 to transition to its foreground position and the first text area to transition to the background position. The sender enter the text "I can't go." at 88. The sender selects the sad emotions preset, for examples, which then cause the initial message to display the "I" skewed at 90, followed by the "can't" at 92 that is displayed after the "I" and with increased character spacing, and the "I can't go . . . " at 94 with the "go . . . " displayed after the "can't", with increased cord spacing and ellipses in place of the ".". The phrase "I can't go . . . " is then reduced in size at 96 and the word spacing in reduced to convey an feeling is sadness and "getting smaller" at 98.

Figure 8:
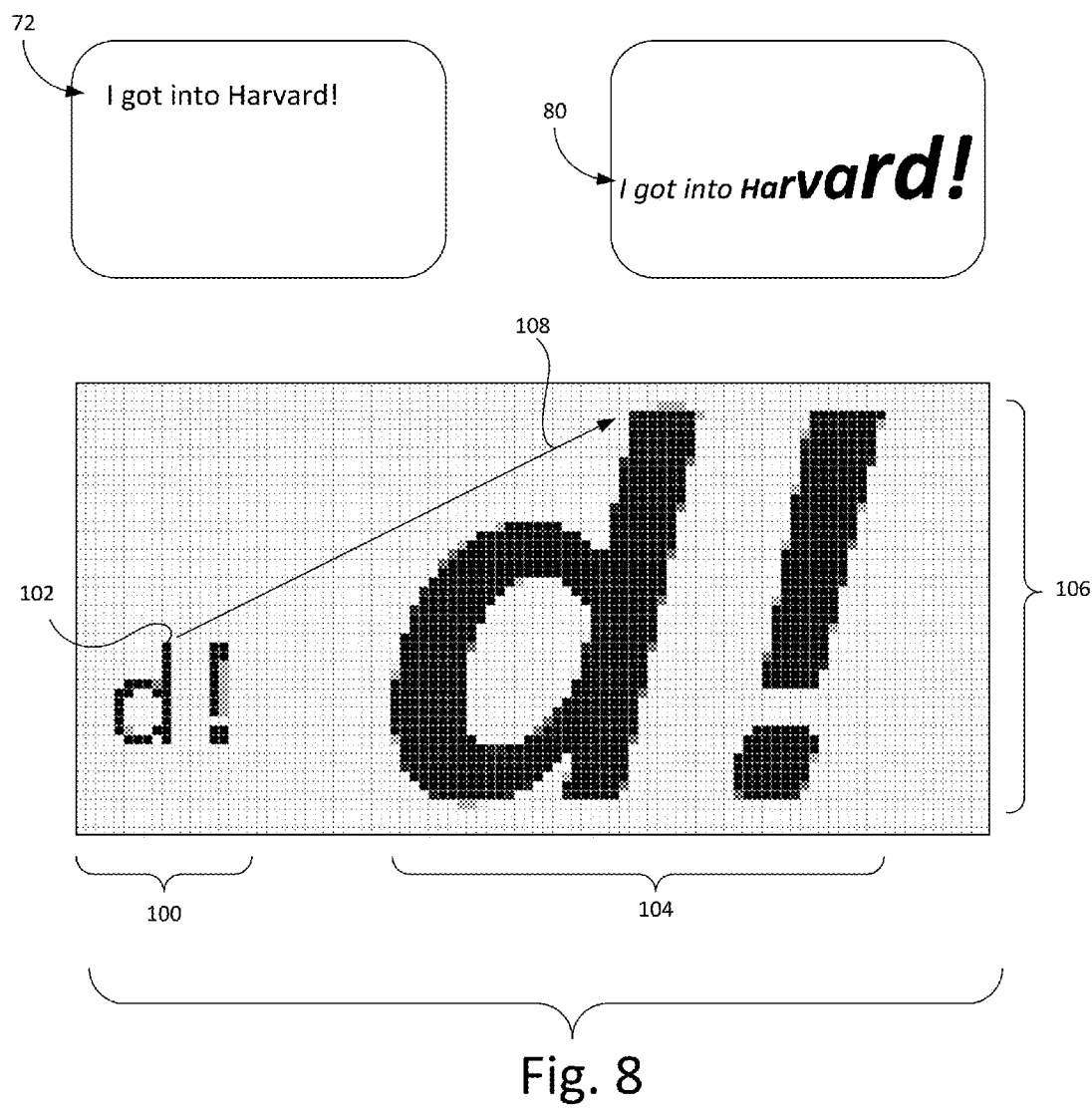
FIG. 8 is a front view and schematic of aspects of the invention.

Referring to FIG. 8, the emotional text creation is described in more detail. In transitioning from the initial message 72 to the intermediate message 80, the computer readable instructions can determine an initial bitmap 100 that can represent a character, a plurality of characters as shown 102, a word, a phrase of the entire message. An end state bitmap 104 can be created and a pixel map 106 can be created according to the initial bitmap and the end bitmap. A pixel path 108 for each pixel in the pixel map associate with a pixel for the initial states and the end state that plots the path and partially the animation from the initial states to the end state.

Figure 9:
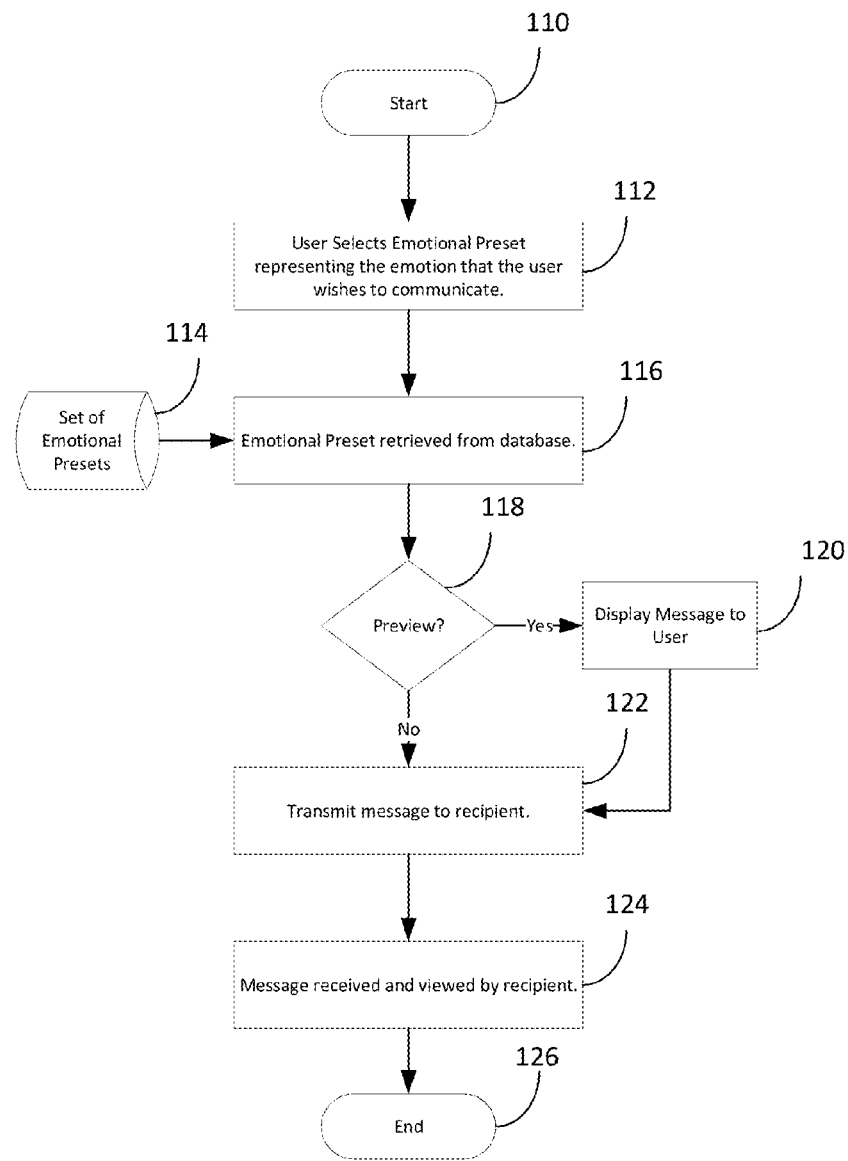
FIG. 9 is a flowchart of aspects of the invention.

Referring to FIG. 9 a flow chart of the invention is shown. At 110, the process begins. At 112, a user selects the emotional preset that represents the emotion they want applied to text. The emotional preset is retrieved from a database 114 as step 116. In one embodiment, each emoticon has its own presets that instructs how the text should look and behave (respectively attributes and kinetics). An emotional preset is made up of attribute and kinetic values that characterize an emotion. In one embodiment, a set of emotional presets can be stored in the computer readable medium wherein each emotional preset can include a set of attributes and a set of kinetics. The set of attributes can include a set of sub-attributes selected from the group consisting of linear scale, vertical scale, horizontal scale, skew, line spacing, character spacing, position, blur, stroke, path shape, and any combination thereof. The set of kinetics can include a set of sub-kinetics selected from the group consisting of opacity, character motion, word motion or any combination thereof. In one embodiment, the set of sub-attribute can include: the ratio of horizontal to vertical scale, line spacing, character spacing (such as kerning), relative positioning (such as the relative position of one character in relation to the adjacent character), skew (such as slant or obliqueness), blur (such as distortion of the delineation), and stroke (such as an increase or decrease in boldness of one or more characters). The timing, speed, and direction of how these traits change over period of time produces an animated text.

The user is offered the opportunity to preview the message at 118 and if the user accepts the offer, the message can be previewed at 120 wherein the set of message computer readable instructions can include instructions for displaying the sized animation social text message on the sender's display for review and confirmation of transmission prior to transmitting the sized animation text message to the receiver's computer-mediated communication system.

The final animated text message or social message can then be transmitted to the recipient at 122 and received by the recipient at 124. The recipient can receive the animated text message or animated social message on the recipient compute or mobile device through the recipient's CMC, social media, email, and the like. The process can end for this animated text message or social message cycle at 126. Therefore, non-textual/nonverbal communication is achieved by visualizing the attribute traits, and how they change over a period of time, (animation). This methodology is what allows this invention to be applied to different types of CMC platforms. This invention is also designed to allow the storing and transmitting of animated message text or social messages. The programming language was established specifically to allow this data to be functional virtually and visually within a standard CMC device. Therefore, this invention can be added to existing CMC systems. This invention allows the sender the ability to express emotions by the virtue of communicating nonverbally and can be used with any text based CMC device. The platform used to carry out this method may be anywhere emoticons are currently available for use, namely, mobile messaging (e.g. SMS), instant messaging, and email applications. The prime use would be in a messaging application used by mobile device, i.e. mobile text messaging (e.g,. SMS), considering the frequency of use.

Figure 10:
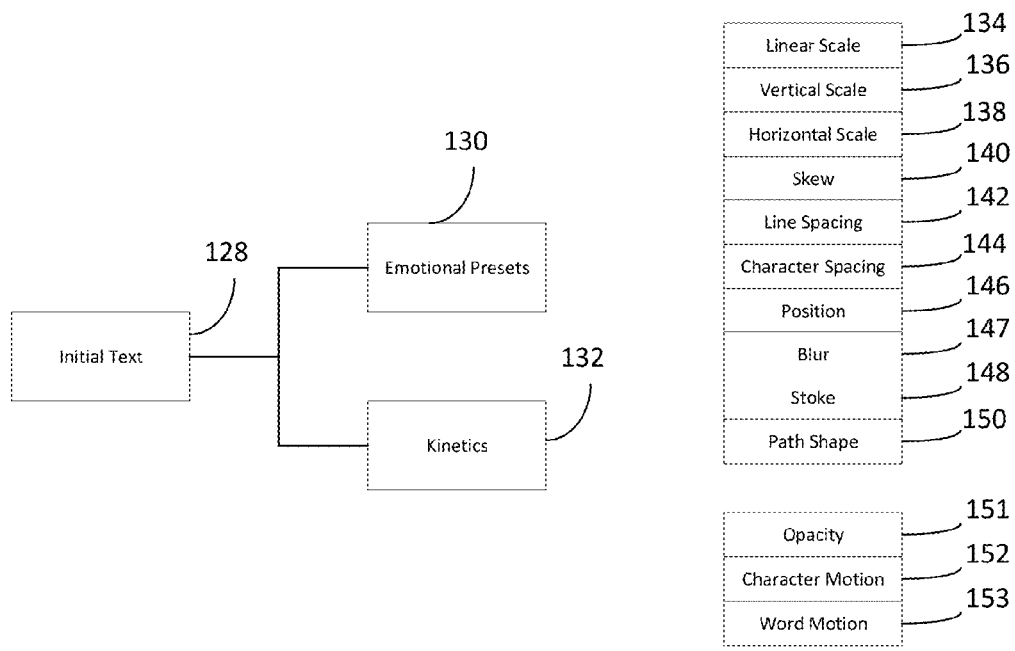
FIG. 10 is a schematic of some components of the invention.

Referring to FIG. 10, a set of message text characters 128 that is to be sent from the sender to a recipient can be modified with the invention to include emotional preset 130 and kinetics 132. The emotional presets can include attributes such as linear scale 134, vertical scale 136, horizontal scale 138, skew 140, line spacing 142, character spacing 144, position 146, blur 147, stoke 148, path shape 150, and any combination thereof. Kinetics can include opacity 151, character motion 152, and word motion 153.

The emotional presets can also include timing, fade, smoothness, strength (0-50% sharp edges and 50.1-100% smooth edges), horizontal and vertical dimensions or ratios of the height to width. Attributes that can be included shown below:

```
OPACITY, O
    TIMING
        FADE ON, IE SMOOTHNESS STRENGTH
```

```
        0-50%=SHARP
        50.9-100%=SMOOTH
SCALE, S: [HORIZONTAL, VERTICAL]=[HS,VS] = [X,Y],
BASE IS [100,100%.]
        *VALUES ARE RATIOS
LINE SPACING, LEADING
CHARACTER SPACING, CS, KERNING: +/−, BASE OF 0
POSITION, PT: +/− [X,Y], BASE OF [0,0]
SKEW, SK: +/− DEVIATION FROM 90 DEGREE ANGLE
BLUR, B : [X,Y]
STROKE, SK : BOLDNESS, PRESSURE, −/+, BASE OF 0.
```

Animations can be included and additionally include time and path shape. The animations can be summarized in the following table:

```
TIME: BASE FORMULATED BY # OF CHARACTERS, SPACES AND EFFECTS
    SPEED: PITCH, FREQUENCY
    PER CHARACTER: FAST, HIGH PITCH, FREQUENT ARTICULATIONS, HIGH
        ENERGY
    PER WORD : SLOW, LOW PITCH, LESS FREQUENT ARTICULATIONS, LOW
        ENERGY
    ACTION ONSET : POST ACTION, LIVE ACTION
    TYPES : INCREASE OR DECREASE
    ¹ OPACITY, O
        SHARP: HIGH PITCHES, FAST, MINIMAL TO NO FADE ON I.E. SHARP,
ABRUPT
        SMOOTH: LOWER PITCH, SLOW, MEDIUM TO HEAVY FADE ON, I.E.
HEAVY, SMOOTHER
    ² SCALE, S
        VERTICAL SCALE, VS: HIGH ENERGY EMOTIONAL STATES*
        HORIZONTAL SCALE, HS: LOW ENERGY EMOTIONAL STATES*
    ³ LINE SPACING, LS : WIDE, CLOSE, OR EVEN
    ⁴ CHARACTER SPACING, CS, KERNING : CROWDING OR SPACING OUT
    ⁵ POSITION, P : RISING OR FALLING, (ABOVE/BELOW) FROM BASE LINE
    ⁶ SKEW, SW : INCREASING OR DECREASING ANGULAR DEGREE FROM BASE
    ⁷ BLUR, BLR : [X, Z] STRETCHING DISTORTION FROM BASE
    ⁸ STROKE, SK : INCREASING OR DECREASING PRESSURE, INTENSITY,
BOLDNESS
    ⁹ PATH SHAPE, PH : VARIABLE
```

The attributes and kinetics can be included in the emotional presets to represent emotions including, happiness, joy, sadness, anger (cold and hot), fear, frustration, anxiety, and sarcastic. These emotional presets can also include aftereffects such as post-action, verbal and vocal channels, that represent "do not agree", "correspond", "concur" and "irony".

Examples of attributes and kinetics for emotional preset in one embodiment are shown below:

1280 × 720 px
37px True type font 2048 units/em

| Attribute | Unit | Default Min | Default Max | Happy | Sad | Angry | Frustrated | Sarcasm |
|---|---|---|---|---|---|---|---|---|
| Opacity (fade on) | % | 0% | 100% | 45-50% | 90-100% | 10-20% | 45-75% | 50-75% |
| Type Size | px | 15px | 100px | 37px | 37px | 37px | 37px | 37px |
| Scale | [X:Y] % | 25% | 300% | | | | | |
| Horizontal Scale | [X] % | 50% | 400% | 140->80% | 90% | 100% | 45% | 100% |
| Vertical Scale | [Y] % | 50% | 400% | 110->115% | 70% | 125% | 60% | 120% |
| Skew | −/+90° degrees | −90° | 150° | 10 (100°) | 25 (115°) | 0 (90°) | 10 (0x + 80°) | −15 (75°) |

-continued

| | | | | Default | | | | |
|---|---|---|---|---|---|---|---|---|
| Attribute | Unit | Min | Max | Happy | Sad | Angry | Frustrated | Sarcasm |
| Line Spacing | Point, pts | (0, −100) | (0, 50) | Single, 1.0 | Single, 1.0 | Single, 1.0 | Single, 1.0 | Single, 1.0 |
| Character Spacing/ Tracking | units/em | −250 | +250 | 0-5 | −2 | −95 | −42 | −40 |
| Position | [+/−X, +/−Y] | (0, 0) | (+640, +360) | (0, 0)t to (0, −45) to (0, 0) jumping | (0, −25) to (0, 0) falling | N/A | (0, 5) to (0, 14) rising | N/A |
| Rotation | X: 0x + 0.0° | 0 | 360 | NA | NA | NA | NA | NA |
| | Y: 0x + 0.0° | 0 | 360 | NA | NA | NA | NA | (0x + 0.0°) to (0x + 180°) Variable |
| Blur | [X, Y] | (−100, −100) | (100, 100) | NA | NA | NA | NA | NA |
| Stroke Path Shape | px Variable | 0 | 10 | | | 2 | | |

1280 × 720 px
37px True type font 2048 units/em

The invention can also include effects and/or features that enhance the level of emotion. These effects can be applied post-emotional preset application or to the text message itself. Features may not relate directly to acoustic or graphology. Examples can include animated pictures and animation types. Kinetics and animation can change over time and can be derived or similar the prosodic elements of speech (e.g. pitch, volume, and intonation). An effect from the set of effects that can be applied to a character, word or phrase and can be used to symbolize or communicate intonation and other non-verbal communications. The effects that are allowed for selection by the sender can be variability dependent on the emotional preset type.

Figure 11:
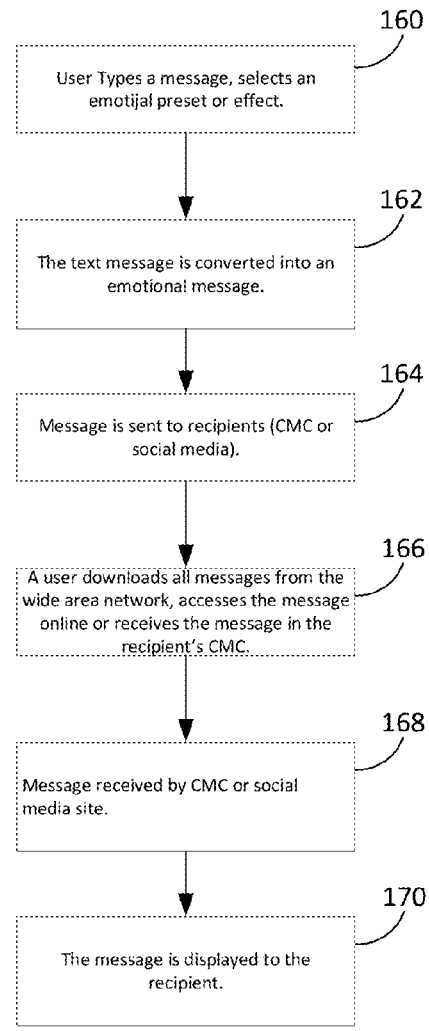
FIG. 11 is a flowchart of aspects of the invention.

Referring to FIG. 11, the operation of the invention is further detailed. The user or sender creates a text message using a smart phone or other CMC device. The user or sender then actuates the ability to select an emotional preset and selects an emotional preset that represents the emotion that the sender wishes to communicate at 160. The user then indicates that the message is to be sent by actuating the computing device such as a mobile computer, smart phone and the like. The message and emotion is converted into an emotional message having animation or other emotional preset or effect attributes at 162. The emotional message can then be sent across a wide area network that can contain an array of potential recipients such as the CMC of a recipient or social media sites at 164. One of the selected recipients can then select for download or can have the message automatically transmitted to the recipient's device at 166. The message received by the recipient's CMC or social media site at 168. The message is then rendered, converted for displayed or simply displayed so that the text message and emotional aspects of the message are displayed to the recipient at 170.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits, and advantages of the present invention will be apparent from this summary and certain embodiments described below, and will be readily apparent to those skilled in the art. Such objects, features, benefits, and advantages will be apparent from the above in conjunction with the accompanying examples, data, figures, and all reasonable inferences to be drawn therefrom, alone or with consideration of the references incorporated herein.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A computerized system for emotionally augmented computer-mediated communication comprising:
    a mobile communications device having a display, computer readable medium, processor, input assembly, transceiver and a sender's computer-mediated communication system;
    a first text area displayed on the display having a foreground and a background position;
    a second text area displayed on the display having a foreground position and a background position and partially overlapping the first text area wherein the second text area transitions from its foreground position to its background position and the first text area transitions from its background position to its foreground position in conjunction with the second text area transmitting, wherein the first text area and the second text area are configured to indicate which user was the last user in the conversation to have sent a message;
    a set of emotional presets stored in the computer readable medium wherein each emotional preset includes a set of attributes and a set of kinetics, configured to display an emotion corresponding to the preset, wherein the set of attributes include sub-attributes selected from the group consisting of linear scale, vertical scale, horizontal scale, skew, line spacing, character spacing, position, blur, stroke, path shape and any combination thereof and the set of kinetics includes a set of sub-kinetics selected from the group consisting of opacity, character motion, word motion or any combination thereof;
    a set of effects stored in the computer readable medium including scale, stroke, position and time;
    a set of messaging computer readable instructions including in the computer readable medium, when executed by the processor, include instructions for receiving an emotional preset selection through the input assembly representing the sender's emotional selection, receiving an effect selection through the input assembly representing the sender's effect selection, intercepting a set of message text characters in a lined format representing an outgoing message from the sender's computer-mediated communication system, placing the first text area in its background position and placing the second text area in its foreground position, determining an initial state for the set of message text characters, determining an end state for the set of message text characters according to the emotional selection preset and the effect selection, determining an animation path having a plurality of incremental states between the initial state and the end state, determining an animation area size according to the initial state wherein the animation area is equal to or less than the area of the second text area, emotional preset selection, effect selection, animation path, and end state, converting the set of message text characters to an unlined animated text message according to the initial state, emotional preset selection, effect selection, animation path, and end state, sizing the animated text message to fit within the animation area size, displaying the sized unlined animated text message on the display in the second text area, and transmitting the sized unlined animated text message to a receiver's computer-mediated communication system; and,
    a set of canvas computer readable instructions including in the computer readable medium, when executed by the processor, includes instruction for receiving a set of social text characters in a lined format representing a social media message, determining an initial state for the set of social text characters, determining an end state for the set of social text characters according to the emotional preset selection and the effect selection, determining an animation path having a plurality of incremental states between the initial state and the end state, determining a social area size according to the initial state, emotional reset selection and the effect selection animation path, and end state, converting the set of social text characters to an unlined animated social text message according to the initial state, the emotional preset selection, the effect selection, animation path, and end state, sizing the unlined animated social text message to fit within the social area size, displaying the sized unlined animated social text message on the display, and transmitting the sized animation social text message to a social media site.

2. The system of claim 1 wherein the set of emotional presets includes emotional preset selections representing the emotions of happy, sad, angry, frustrated, and sarcastic.

3. The system of claim 1 wherein the linear scale modifies an initial message text vertical size between 25% and 300%, the vertical scale modifies the set of message text characters vertical size between 50% and 400%, the horizontal scale modifies the set of message text characters horizontal size between 50% and 400%, the skew modifies the set of message text characters between −90° and +90°, the line spacing modifies the set of message text characters is in the range of 1 to 3, the character spacing modifies the set of message text characters is in the range of 3 points condensed to 10 points expanded, and the blur modifies the set of message text characters by a distortion in the range of 50% to 300%.

4. The system of claim 1 wherein the set of message computer readable instructions for determining an animation path includes instructions for creating an initial bitmap of the message text characters, creating an end bitmap according to the sized unlined animated text message, determining a pixel map according to the initial bitmap and the end bitmap and creating a pixel path for each pixel in the pixel map to transform the set of message text characters to the sized unlined animated text message.

5. The system of claim 4 wherein the set of message computer readable instructions for determining an animation path includes instructions for converting the set of message text characters to an intermediate unlined animated text message, determining a pixel map according to the initial bitmap, the intermediate unlined animated text message, and the end bitmap, creating a first pixel path between each pixel in the pixel map associated with the message text characters and each pixel in the pixel map associated with the intermediate unlined animated message text message and creating a second pixel path between each pixel in the pixel map associated with the intermediate unlined animated text message and the sized unlined animated text message.

6. The system of claim 1 wherein the set of message computer readable instructions for determining an animation path includes instructions for previewing the sized unlined animated text message prior to transmitting the sized unlined animated text message to the receiver's computer-mediated communication system.

7. The system of claim 1 wherein the set of message computer readable instructions for converting the set of message text characters to an unlined animated text message including instructions for receiving a selected word in the set of message text characters, converting the selected word into an animated word according to the effect selection and including the animated word in the sized unlined animated text message.

8. The system of claim 7 wherein the set of effects including scale in the range of 25% to 400%, stroke in the range of 0% to 250%, and position from −2 lines to +2 lines vertically.

9. The system of claim 7 wherein the set of message computer readable instructions for converting the set of message text characters to an unlined animated message text message including instructions for determining an initial word bitmap, creating an end word bitmap, determining a pixel map according to the initial bitmap and the end bitmap and creating a pixel path between each pixel in the pixel map associated with the selected word and each pixel in the pixel map associated with animated word.

10. The system of claim 1 wherein the set of messaging computer readable instructions includes instructions for:
opacity kinetic transitioning of a character from a first transparency to a second transparency wherein the first transparence is in the range of 0% to 100% and the second transparency is in the range of 0% to 100%,
character kinetic transitioning from a first character position to a second character position wherein the second character position is in the range of −200% to +200 in vertical relation to the first character position,
character kinetic scale transitioning from a first character size to a second character size wherein the second character size is in the range of 25% to 300% in relation to the first character size,
character kinetic stroke transitioning from a first stroke value to a second stroke value wherein the second stroke value is in the range of 25% to 250% in relation to the first stroke value and including in the sized unlined animated text message a kinetic transition selected from the group of opacity, kinetic transitioning, character kinetic transitioning, character scale, character kinetic stroke or any combination thereof.

* * * * *